United States Patent
Basham et al.

(10) Patent No.: US 7,779,110 B2
(45) Date of Patent: *Aug. 17, 2010

(54) APPARATUS, SYSTEM, AND METHOD FOR COMMUNICATING CONTROL MESSAGES BETWEEN A FIRST DEVICE AND A SECOND DEVICE

(75) Inventors: Robert Beverley Basham, Aloha, OR (US); Ralph Thomas Beeston, Tucson, AZ (US); Kirby Grant Dahman, Tucson, AZ (US); Christopher Grunow, Tucson, AZ (US); Gerard Grunow, legal representative, Tucson, AZ (US); Ronald David Martens, Benson, AZ (US)

(73) Assignee: International Business Machines Corporation, Armonk, NY (US)

( * ) Notice: Subject to any disclaimer, the term of this patent is extended or adjusted under 35 U.S.C. 154(b) by 207 days.

This patent is subject to a terminal disclaimer.

(21) Appl. No.: 12/171,127

(22) Filed: Jul. 10, 2008

(65) Prior Publication Data
US 2009/0292798 A1 Nov. 26, 2009

Related U.S. Application Data

(63) Continuation of application No. 10/648,583, filed on Aug. 25, 2003, now Pat. No. 7,409,442.

(51) Int. Cl.
*G06F 15/173* (2006.01)
(52) U.S. Cl. .................... 709/223; 709/246; 709/238
(58) Field of Classification Search ............ 709/223, 709/246, 238, 232, 217–219
See application file for complete search history.

(56) References Cited

U.S. PATENT DOCUMENTS

| | | | |
|---|---|---|---|
| 5,664,146 A * | 9/1997 | Bolin et al. | 711/114 |
| 5,805,821 A | 9/1998 | Saxena et al. | |
| 5,911,148 A * | 6/1999 | Anglin et al. | 711/111 |
| 5,925,119 A | 7/1999 | Maroney | |
| 6,052,341 A * | 4/2000 | Bingham et al. | 711/112 |
| 6,128,717 A | 10/2000 | Harrison et al. | |
| 6,269,431 B1 | 7/2001 | Dunham | |
| 6,338,006 B1 | 1/2002 | Jesionowski et al. | |
| 6,772,209 B1 | 8/2004 | Chemock et al. | |
| 6,785,744 B2 * | 8/2004 | Fairclough et al. | 711/114 |
| 6,891,837 B1 | 5/2005 | Hipp et al. | |
| 7,007,042 B2 | 2/2006 | Lubbers et al. | |
| 7,007,152 B2 | 2/2006 | Pesola et al. | |

(Continued)

*Primary Examiner*—Philip B Tran
(74) *Attorney, Agent, or Firm*—Kunzler Needham Massey & Thorpe

(57) ABSTRACT

An apparatus and system are provided for communicating control messages between a first device and a second device. The apparatus and system include a communication module that directs control messages between a first device and a second device through an intermediate device. The intermediate device is coupled to the first device by a control path and to the second device by a data path. The apparatus and system also include a translation module and a transmission module that cooperate to translate control messages received over the control path at the intermediate device to transport data messages and transport data messages received over the data path at the second device to control messages. Transport data messages are sent over the data path to the second device and control messages from the second device are sent over the control path to the first device.

21 Claims, 5 Drawing Sheets

U.S. PATENT DOCUMENTS

| | | |
|---|---|---|
| 2002/0004883 A1 | 1/2002 | Nguyen et al. |
| 2002/0035451 A1 | 3/2002 | Rothermel |
| 2002/0069324 A1 | 6/2002 | Gerasimov et al. |
| 2003/0037046 A1 | 2/2003 | Trossell et al. |
| 2003/0079080 A1 | 4/2003 | DeMoney |
| 2003/0091037 A1 | 5/2003 | Latif et al. |
| 2004/0153614 A1 | 8/2004 | Bitner et al. |
| 2004/0221101 A1* | 11/2004 | Voorhees et al. ............ 711/111 |

* cited by examiner

APPARATUS, SYSTEM, AND METHOD FOR COMMUNICATING CONTROL MESSAGES BETWEEN A FIRST DEVICE AND A SECOND DEVICE

CROSS-REFERENCE TO RELATED APPLICATIONS

This application is a continuation of U.S. patent application Ser. No. 10/648,583 filed on Aug. 25, 2003, now U.S. Pat. No. 7,409,442, entitled APPARATUS, SYSTEM, AND METHOD FOR COMMUNICATING CONTROL MESSAGES BETWEEN A FIRST AND A SECOND DEVICE, and claims all rights of priority and incorporation available due to this continuation relationship

BACKGROUND OF THE INVENTION

1. Field

This invention relates to data storage systems. Specifically, the invention relates to apparatus and systems for communicating control messages between a first device and a second device.

2. Description of the Related Art

High density, removable media storage libraries are used to provide large quantities of storage in a computer system. Typically, such data storage systems are employed for backup or other secondary storage purposes, but may be used as primary storage in circumstances that are conducive to sequential data access and the like.

FIG. 1 illustrates a block diagram of a conventional system 100 that includes a removable media storage library. The system 100 includes an Automated Library Unit (ALU) 102 and at least one host 104. Each host 104 may be a mainframe computer. Alternatively, the hosts 104 may be servers or personal computers using a variety of operating systems.

The ALU 102 includes a library manager (LM) 106, one or more data drive devices, which may be tape drive units 108, an accessor 110, and a plurality of media cartridges 112. The plurality of media cartridges 112 may be stored in one or more media cartridge storage bins (not shown).

The LM 106, which includes at least one computing processor, is interconnected with, and controls the actions of, the tape drive units 108 and the accessor 110. The LM 106 typically also includes one or more hard disk drives (not shown) for memory storage, as well as, a control panel or keyboard (not shown) to provide user input. The control panel may be a computer in communication with the LM 106 so that a user can control the operating parameters of the automated tape library unit 102 independently of the host 104.

FIG. 1 illustrates three tape drive units 108a, 108b, and 108c. The system 100 may include a number of tape drive units 108. The tape drive units 108 may share one single repository of cartridges 112. Alternatively, the tape drive units 108 may independently correspond to and utilize multiple repositories of cartridges 112. The tape drive units 108 may advantageously be distributed over multiple locations to decrease the probability that multiple tape drive units 108 will be incapacitated by a disaster in one location.

The accessor 110 may be a robotic arm or other mechanical device configured to transport a selected cartridge 112 between a storage bin and a tape drive unit 108. The accessor 110 typically includes a cartridge gripper and a bar code scanner (not shown), or similar read system, mounted on the gripper. The bar code scanner is used to read a volume serial number (VOLSER) printed on a cartridge label affixed to the cartridge 112. In alternative embodiments, the tape drive units 108 may be replaced by optical disk drives or other magnetic drives. Similarly, the cartridges 112 may contain magnetic media, optical media, or any other removable media corresponding to the type of drive employed.

Generally, the host 104 connects via a data path 114 directly to the tape drive units 108. The data path 114 may comprise a storage area network (SAN) or similar communications channel. The data path 114 serves to rapidly transfer large quantities of data between two devices. Accordingly, the data path 114 uses high speed protocols optimized to move data such as Fibre Channel, Enterprise System Connection® (ESCON), Fiber Connection (FICON) channel, Small Computer System Interface (SCSI), and the like. Of course the data path 114 may include other controllers, switches, and the like for supporting the data transfer protocol which have been omitted for clarity. The data path 114 may comprise a network such as a storage area network (SAN), a local area network (LAN), wide area network (WAN), or a different type of network, such as the Internet. Alternatively, the data path 114 may comprise a direct connection between the host 104 and the tape drive units 108.

The host 104 communicates control information over a control path 116 to the LM 106. The control path 116 may also be referred to as a host control path 116 because instructions generally originate from the host 104 and are directed to the LM 106. Of course instructions may also flow from the LM 106 to the host 104.

Conventional systems 100 also include separate control links 118. The control links 118 and control path 116 are shown as dashed lines to indicate that the host 104 and LM 106 transmit and receive control signals, rather than data to be transferred to the tape drive units 108 and/or the accessor 110. Data for storage or retrieval may instead be transmitted directly between the host 104 and the tape drive units 108 via the data path 114.

Generally a control path 116 and control links 118 comprise physical cables such as RS-232 cables and employ conventional serial protocols such as TCP/IP or other protocols used on a LAN. Each control link 118a, 118b, 118c between a tape drive 108 and the LM 106 requires a separate physical cable connected on each end to a separate physical communication port.

Unfortunately, the control links 118 limit the capabilities of the automated library unit 102. Specifically, each control link 118 typically has a length limitation and must have a separate physical communication port on the LM 106. Consequently, the LM 106 will only support a number of tape drives 108 corresponding to the maximum number of physical communications (minus two for the host control path 116 and the control link 118 to the accessor 110). The communication links 118 may be made from different kinds of cable for example, RS-232, RS-422, or the like. However, these cables are operable up to a maximum length. Accordingly, the tape drives 108a must be located relatively close to the LM 106 to properly exchange control information. Furthermore, the cable for the control links 118 increases the cost of the system 100. Maintaining and troubleshooting faulty cables for control links 118 may also be difficult due the number of cables and similarity in appearance.

Accordingly, what is needed is an apparatus, system, and method to overcome the inefficiencies of conventional data storage systems that include control links 118 between the LM 106 and the tape drive units 108. In particular, the apparatus, system, and method should replace the physical control links 118 with a virtual control link between the LM 106 and tape drives 108 using the existing control path 116 and data path 114. Such a virtual control link should permit any number of tape drives 108 to communicate control information with the LM 106. In addition, the apparatus, system, and method should provide the virtual control link such that modifications to the control information protocol do not require corresponding modifications to the virtual control link. Such an apparatus, system, and method is provided herein.

BRIEF SUMMARY OF THE INVENTION

The present invention has been developed in response to the present state of the art, and in particular, in response to the problems and needs in the art that have not yet been fully solved by currently available cache management apparatus, systems, and methods. Accordingly, the present invention has been developed to provide a process, apparatus, and system for communicating control messages between a first device and a second device that overcome many or all of the above-discussed shortcomings in the art.

An apparatus according to the present invention includes a communication module, translation module and a transmission module. The communication module directs control messages between a first device and a second device through an intermediate device. The intermediate device is coupled to the first device by a control path and to the second device by a data path. Preferably, the communication module comprises corresponding components located within the first device and the second device.

The translation module translates control messages received over the control path at the intermediate device to transport data messages. The translation module also translates transport data messages received over the data path at the second device to control messages. Preferably, the communication module comprises corresponding components located within the intermediate device and the second device.

The transmission module sends transport data messages from the intermediate device over the data path to the second device. The transmission module also sends control messages from the second device over the control path to the first device. Preferably, the communication module comprises corresponding components located within the intermediate device and the second device.

A system of the present invention is also presented for communicating control messages between a first device and a second device. In particular, the system, in one embodiment, includes a media library and a host. The media library includes a media library manager that issues control information to a plurality of storage devices for mounting and unloading media cartridges.

The host is configured to communicate with the media library manager over a host control path and with the plurality of storage devices over a data path. The host relays control messages between the media library manager and the plurality of storage devices. The control messages are translated into transport data messages which travel over the data path to the storage devices. Transport data messages are translated into control messages that travel over the host control path.

A process of the present invention is also presented for communicating control messages between a first device and a second device. In one embodiment, the process includes directing control messages between a first device and a second device through an intermediate device. The intermediate device is coupled to the first device by a control path and to the second device by a data path. The intermediate device translates control messages received over the control path to transport data messages and transport data messages received over the data path to control messages. Transport data messages are transferred between the intermediate device and the second device over the data path. Control messages are transferred between the intermediate device and the first device over the control path. Transport data messages received by the second device are translated into control messages.

The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
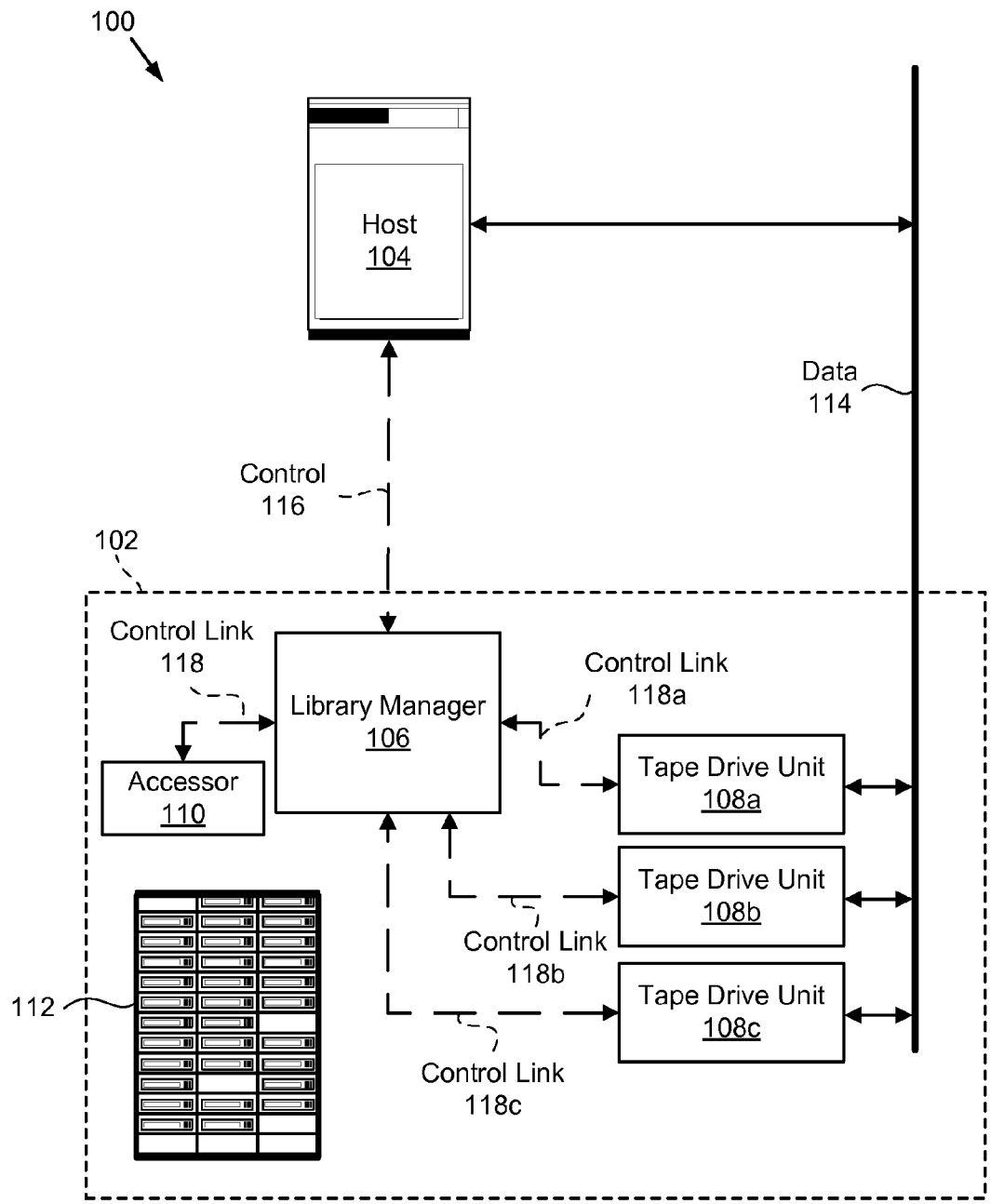
FIG. 1 is a schematic block diagram illustrating a conventional data storage system that includes physical control links between a library manager and media drive units 108.

It will be readily understood that the components of the present invention, as generally described and illustrated in the figures herein, may be arranged and designed in a wide variety of different configurations. Thus, the following more detailed description of the embodiments of the apparatus, system, and method of the present invention, as represented in FIGS. 2 through 5, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 2:
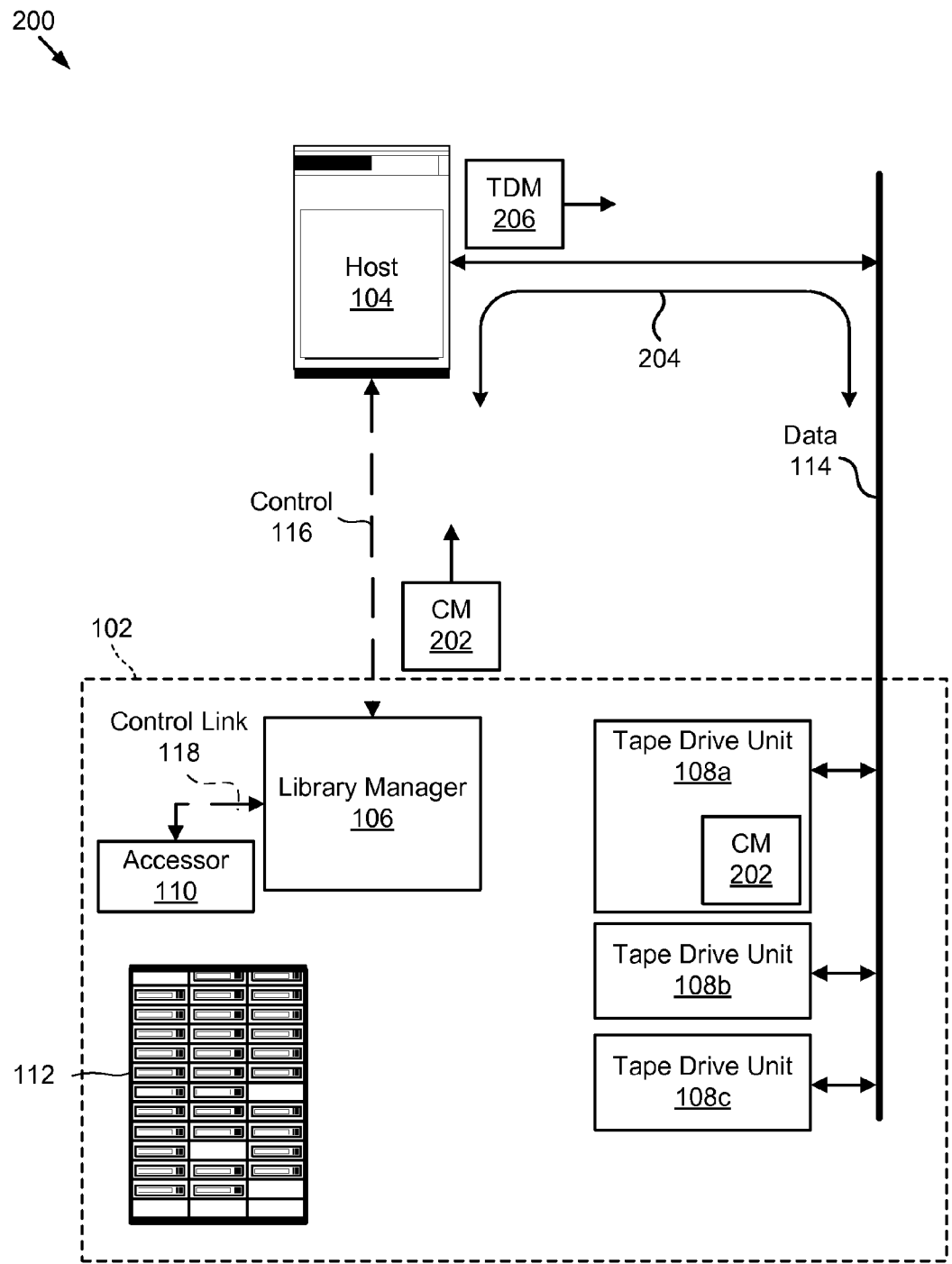
FIG. 2 is a schematic block diagram illustrating one embodiment of a system in accordance with the present invention that replaces physical control links with a logical control path.

FIG. 2 illustrates a system 200 for communicating control messages between a first device and a second device. The system 200 includes substantially the same components as depicted in FIG. 1, except for the control links 118 between the LM 106 and the tape drive units 108. Instead of the direct communication link (control links 118), the LM 106 is configured to exchange control messages (CM) 202 with drive units 108 over the control path 116. The host 104 and tape drive units 108 are configured to provide a logical communication path 204 for CM 202 between the LM 106 and tape drive units 108.

The system 200 includes a media library 102 comprising a LM 106 configured to communicate with the accessor 110 to automatically mount and unload media cartridges 112. The LM 106 coordinates actions of the accessor 110 and tape drive units 108 by issuing CMs 202. CMs 202 typically include basic mechanical operations such as "open tape drive," "close tape drive," "eject tape." Alternatively, certain basic mechanical operations maybe completed in response to more advanced CMs 202 such as "prepare to receive tape," "tape loaded," "clean tape drive head," and the like. Other CMs 202 may originate from the tape drive unit 108. These CMs 202 may include "drive status," "drive configuration report," "mechanical error condition," "tape mounted," and the like. The CMs 202 ensure that automated actions by the accessor 110 such as loading a new tape may be properly completed. For example, a CM 202 ensures that the tape drive unit 108 "mouth" is open to receive a new tape presented by the accessor 110. Of course CMs 202 may comprise almost any command from the LM 106 to the tape drive unit 108. In one embodiment, a control message 202 instructs the tape drive unit 108 to set its internal clock to a specific time.

The system 200 also includes a host 104. The host 104 communicates over a host control path 116 with the LM 106 of the media library 102. The host 104 uses the host control path 116 to request that the LM 106 mount a specific media cartridge 112 on a specific tape drive unit 108a. Of course the host 104 may issue a variety of commands to the LM 106 over the host control path 116 including diagnostic commands, error recovery commands, and the like. Similarly, commands and other control information may originate from the LM 106 directed to the host 104 and communicated over the host control path 116.

The host 104 is configured to distinguish between commands from the LM 106 to the host 104 and CMs 202. Preferably, a CM 202 is addressed to a specific tape drive unit 108 for example tape drive unit 108a. The host 104 translates CMs 202 into a message suitable for transfer over the data path 114 to a tape drive unit 108.

In certain embodiments, the host translates the CM 202 into a Transport Data Message (TDM) 206. A TDM 206 serves to transport a message across a data path 114. Preferably, the TDM 206 transfers an unaltered CM 202 over the data path 114. In certain embodiments, the TDM 206 is a data packet wrapped around the CM 202 that comprises the data portion of the TDM 206. The host 104 addresses the TDM 206 to the same tape drive unit 108a addressed by the original CM 202.

The host 104 then sends the TDM 206 over the data path 114 according to the communication protocol of the data path 114. Of course a variety of communication protocols may be utilized on the data path 114 such as Fibre Channel, ESCON, FICON, SCSI, and the like. The TDM 206 is formatted to comply with one or more of the supported protocols on the data path 114.

In one embodiment, the host 104 communicates a TDM 206 to a tape drive unit 108 in the form of two different Command Descriptor Blocks (CDB) for the SCSI protocol. One CDB may be for sending TDMs 206 to a tape drive unit 108. The other CDB may be for receiving TDMs 206 from a tape drive unit 108. As mentioned above, each type of CDB may encapsulate the CM 202 as the data portion of the CDB.

The logical communication path 204 comprises the host control path 116, the data path 114, and cooperation between the host 104 and tape drive units 108 to exchange CMs 202 using TDMs 206. The tape drive units 108 are configured to recognize TDMs 206 and translate the TDMs 206 into CMs 202 that may be processed by the tape drive unit 108 as though the CMs 202 were received over the missing control links 118. The logical communication path 204 allows the host 104 to relay CMs 202 between the LM 106 and a plurality of storage devices such as tape drive units 108.

Figure 3:
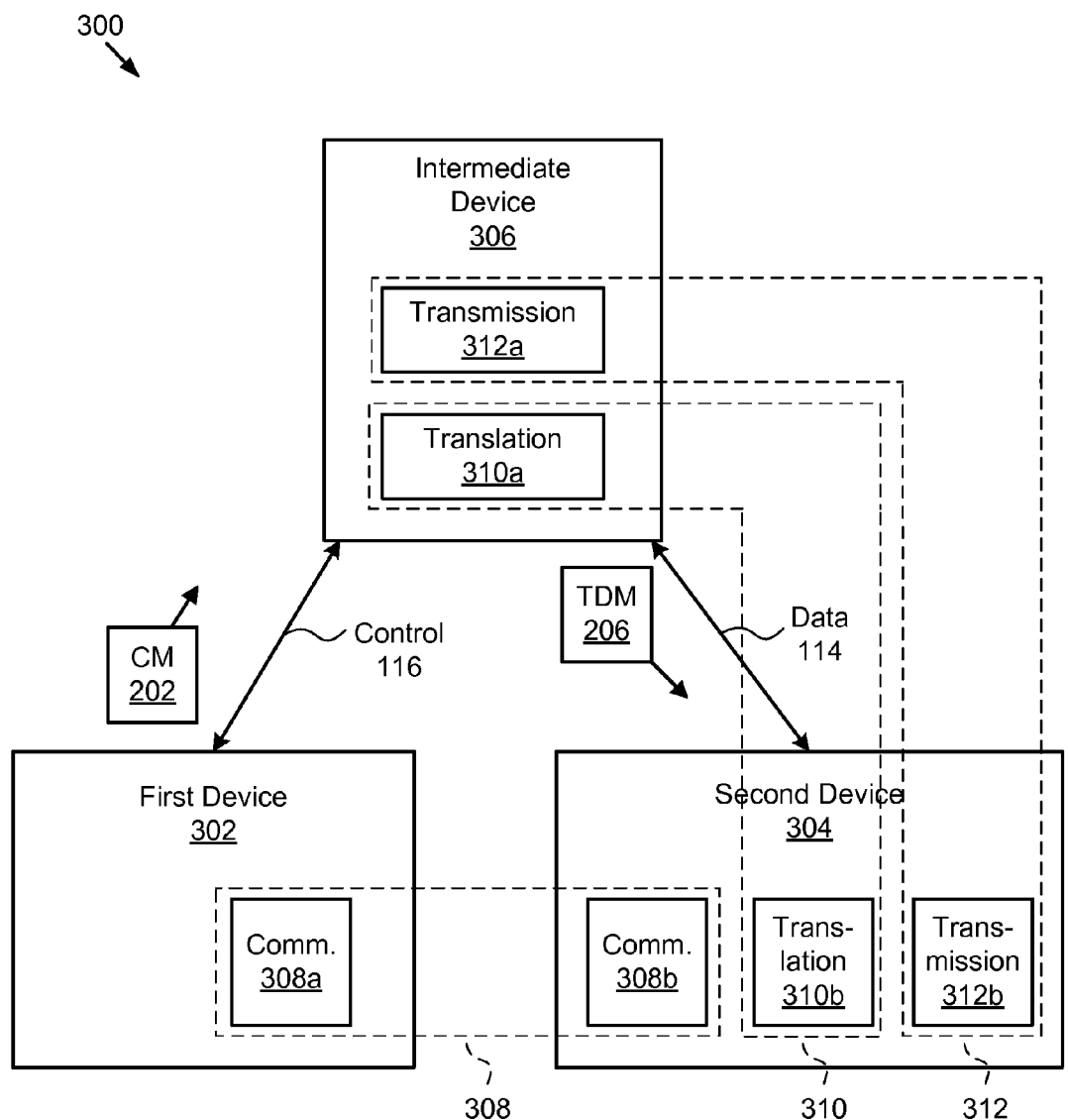
FIG. 3 is a logical block diagram illustrating one embodiment of an apparatus in accordance with the present invention.

FIG. 3 illustrates a logical representation of modules of an apparatus 300 for communicating control messages between a first device and a second device. The apparatus 300 includes a first device 302, a second device 304, and an intermediate device 306. The first device 302 is coupled to the intermediate device 306 by a host control path 116. The second device 304 is coupled to the intermediate device 306 by a data path 114. Preferably, there is no operable direct communication link between the first device 302 and the second device 304. In the interest of clarity, the second device 304 represents one or more devices coupled to the data path 114.

While CMs 202 and TDMs 206 are discussed in detail herein, those of skill in the art will recognize that a variety of message types between a first device 302 and a second device 304 may be translated by the intermediate device 306 into another message type such as TDM 206 within the scope of the present invention. Accordingly, such similar exchange of messages using two different communication paths and an intermediate device 306 are considered within the scope of the present invention.

Preferably, the apparatus 300 comprises several modules. In the illustrated embodiment, these modules are divided into a pair of corresponding components that cooperate to perform the function of the module such as sending and receiving of messages such as CMs 202. Reference to one component or the other or the module shall imply a reference to the other, unless the context of the reference indicates otherwise. Typically, the flow of messages between components will be described herein, in the context of, sending messages or receiving messages with the understanding that those of skill in the art will readily recognize how to implement the corresponding function, sending or receiving.

The apparatus 300 includes a communication module 308 comprised of two communication components 308a, 308b. One communication component 308a is implemented in the first device 302 and the other communication component 308b is implemented in the second device 304. The communication module 308 serves to redirect CMs 202 from an unconnected physical communication port to another port for the logical communication path 204 (sending CMs 202 to and from the intermediate device 306).

The communication component 308a, 308b, may be simple or complex. For example, within the first device 302 the communication component 308a may comprise a configuration setting of a configuration file that indicates which physical communication port the first device 302 is to use for sending and receiving CMs 202. Similarly, within the second device 304 the communication component 308b may comprise a configuration setting or a software or hardware module that sends and receives CMs 202 over the physical port connected to the data path 114.

The apparatus 300 also includes a translation module 310. The translation module 310 translates CMs 202 into TDMs 206 and TDMs 206 into CMs 202. A translation component 310a within the intermediate device 306 recognizes CMs 202 received over the control path 116 and translates these into TDMs 206 for transfer over the data path 114. Similarly, the translation component 310a translates TDMs 206 received over the data path 114 into CMs 202 suitable for transfer over the control path 116.

In addition, the translation component 310b within the second device 304 recognizes CMs 202 from the second device 304 to the first device 302 and translates the CMs 202 into TDMs 206 for transport over the data path 114. Likewise, the translation component 310b translates TDMs 206 received over the data path 114 into CMs 202 understandable to the second device 304.

In addition, the apparatus 300 includes a transmission module 312. The transmission components 312a, 312b send and receive TDMs 206 over the data path 114. One transmission component 312a resides within the intermediate device 306 while the other transmission component 312b resides within the second device 304.

Those of skill in the art will readily recognize that the translation module 310 and transmission module 312 may be implemented in various ways. In one embodiment, as mentioned above, TDMs 206 are exchanged over the data path 114 using two new Command Descriptor Blocks (CDB) according to the SCSI protocol. Alternatively, other parallel or serial transport protocols may be used including FAST-20 SCSI, FAST-40 SCSI, Fibre Channel SCSI Protocol (FCP), SCSI over TCP/IP (iSCSI), SCSI Remote Data Management Access (RDMA) Protocol (SRP), and the like.

In one embodiment, two new CDBs are defined that include as arguments the length of the data and the data itself. In this configuration, the data associated with the CDB is a CM 202 received by the intermediate device 306 or a CM 202 originating from the second device 304. The CDBs serve as transport mechanisms over the data path 114. In one configuration, the TDM 206 may comprise a sending or receiving CDB and the associated parameters.

For example, one CDB may represent sending of messages across the data path 114 and may be referred to as a Send Simulated Library Message (SSLIM) CDB. The translation module 310, specifically the translation component 310a produces a SSLIM CDB. First, the translation module 310 distinguishes a CM 202 received from the first device 302 as a CM 202 rather than a control message for the intermediate device 306 which may be accomplished by detecting an identifier such as an identifier in the header of the message received. Second, the translation component 310a produces a TDM 206 that includes the CM 202 in an unaltered form. Of course, certain header information may be changed to comply with the protocol such as framing bits or error checking. Third, as mentioned, a transmission component 312a may transmit the CM 202 as a parameter or as payload in a data packet of the SSLIM CDB implementing the TDM 206 to the second device 304.

The transmission component 312b within the second device 304 distinguishes the TDM 206 embodied as a SSLIM CDB from other messages on the data path 114. The transmission component 312b communicates the SSLIM CDB to the translation component 310b which parses and reformats the SSLIM CDB to reproduce the CM 202. Typically, the translation component 310b communicates the CM 202 to a processor or controller (not shown) in the second device 304 which responds to the CM 202.

Similarly, the second device 304 may have a CM 202 for the first device 302. Typically, the second device 304 is subservient to the first device 302 so most CMs 202 originate from the first device 302. However, certain CM 202 such as status reports may flow from the second device 304 to the first device 302.

In certain embodiments, due to the primary purpose of the data path 114, transferring large amounts of data, the second device 304 is typically not configured to initiate a message (TDM 206 or data) to a target device connected to the data path 114. Consequently, communication of a TDM 206 from the second device 304 requires that another device coupled to the data path 114 retrieve the TDM 206. In other words, the second device 304 provides the TDM 206 in response to a message from another initiator such as the intermediate device 306. Typically, communications over the control path 116 and or data path 114 involve more than an exchange of a single message. Typically, for each messages sent a response or acknowledgement message is provided by the receiving device.

Those of skill in the art recognize that messages may be retrieved from the second device 304 using various techniques. A few of these techniques are described herein as examples. Of course in certain embodiments, the second device 304 may be configured to independently send TDMs 206 such that retrieval of messages on the second device 304 is not required.

In one embodiment, a transmission component 312b may queue CMs 202 that have been translated to TDMs 206 and are ready to be sent to the first device 302. The first device 302 or intermediate device 306 may poll the second device 304 for any queued TDMs 206. In one embodiment, the first device 302 polls the second device 304 for a response CM 202 subsequent to transmitting a CM 202 to the second device 304 in the form of a TDM 206. Typically, the second device 304 has a CM 202 such as a "ready" status in response to a CM 202 from the first device 302. Alternatively, the first device 302 may periodically poll one or more second devices 304 for any queued TDMs 206 (CMs 202).

In one embodiment, polling the second device 304 may comprise the first device 302 sending a CM 202 such that the intermediate device 306 generates a Receive Simulated Library Message (RSLIM) CDB. The RSLIM CDB is communicated as a type of TDM 206 to the second device 304. The second device 304 interprets the RSLIM CDB as an indication that the first device 302 is prepared to receive the next CM 202 queued in the second device 304. In response to the RSLIM CDB, the second device 304 sends the next queued CM 202 in the form of a TDM 206 to the intermediate device 306 which relays the CM 202 to the first device 302.

In another embodiment, the second device 304 signals when the transmission component 312b has queued a TDM 206 for the first device 302. For example, if the data path 114 supports the SCSI protocol the transmission component 312b may set a unit attention which indicates a queued TDM 206. The intermediate device 306 may read the unit attention error status flag during other communications with the second device 304. In response, the intermediate device 306 sends a CM 202 notifying the first device 302 that a TDM 206 is queued on a specific second device 304. Preferably, the second device 304 is identified by an address since the data path 114 may include a plurality of devices. Consequently, the first device 302 may retrieve the queued TDM 206 by sending a CM 202 that the intermediate device translates into an RSLIM CDB, an addressed TDM 206 sent to the second device 304.

In an embodiment, that utilizes an SSLIM CDB and a RSLIM CDB to implement the TDM 206, the transmission components 312a, 312b may set certain attributes of the CDB such that the SCSI CDB and associated parameters are not checked for deferred errors nor are the TDMs 206 in such an embodiment eligible for assignment checking. Since, the SCSI CDBs are used to transport the CM 202 such error and assignment checking may delay or prevent proper transfers of TDMs 206 between the intermediate device 306 and the second device 304.

Figure 4:
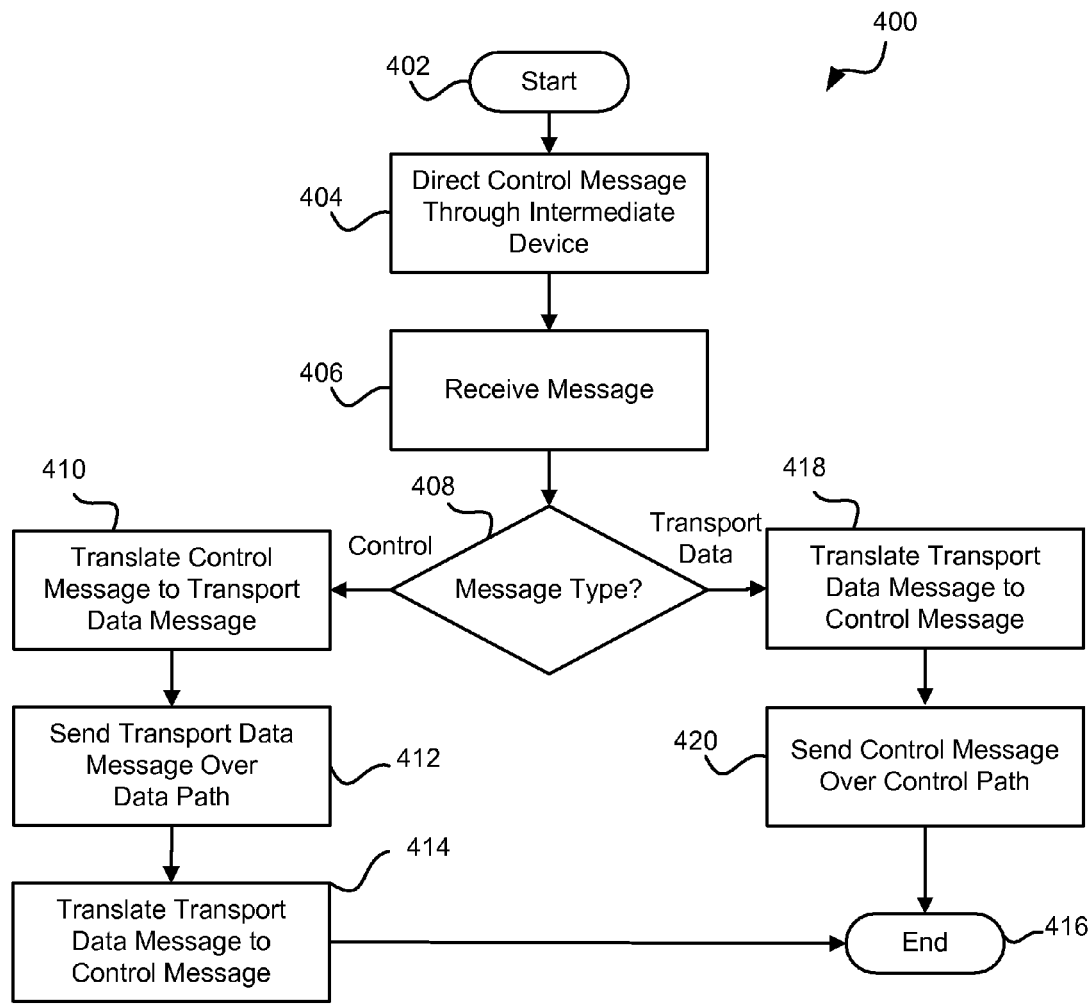
FIG. 4 is a schematic flow chart diagram illustrating a method for communicating control messages between a first device and a second device in accordance with the present invention.

FIG. 4 illustrates a method 400 for communicating control messages between a first device and a second device. The method begins 402 when either the first device 302 or the second device 304 has a CM 202 to be sent. The CM 202 is directed 404 from the first device 302 to the second device 304 or vice versa through the intermediate device 306. Of course if the CM 202 originates from the second device 304, the translation component 310 of the second device 304 translates the CM 202 into a TDM 206.

Preferably, a control path 116 couples the first device 302 to the intermediate device 306. And, a data path 114 couples the intermediate device 306 to the second device 304. As discussed above, directing the CM 202 may be accomplished using a communication module 308 having communication components 308a, 308b respectively within the first device 302 and the second device 304.

The intermediate device 306 receives 406 a messages that is either a CM 202 or a TDM 206. Specifically, a transmission component 312a may receive the message. Once received a determination 408 is made as to which type of message was received. The determination 408 may be made based on determining which physical port of the intermediate device 306 the message was received on. Alternatively, the transmission component 312a may analyze the message to determine the message type.

If the message is a CM 202, the message originated from the first device 302. Consequently, the translation component 312a translates 410 the CM 202 into a TDM 206 suitable for the communication protocol used on the data path 114. Next, the transmission component 312a sends 412 the TDM 206 over the data path 114 to the specific second device 304 intended to receive the enclosed CM 202. Preferably, the communication component 308a ensures that CMs 202 sent to the intermediate device 306 are properly addressed. In one embodiment, the transmission component 312b of the second device 304 receives the TDM 206. The translation component 310b translates 414 to TDM 206 into a CM 202 understandable to the second device 304 and the method 400 ends 416.

If intermediate device 306 determines that the messages is a TDM 206, the message originated from the second device 304. Next, the translation component 310a translates 418 the TDM 206 into a CM 202 suitable for transfer over the control path 116. The transmission component 312a sends 420 the CM 202 over the control path 116 to the first device 302. Finally, the method 400 ends 416.

Figure 5:
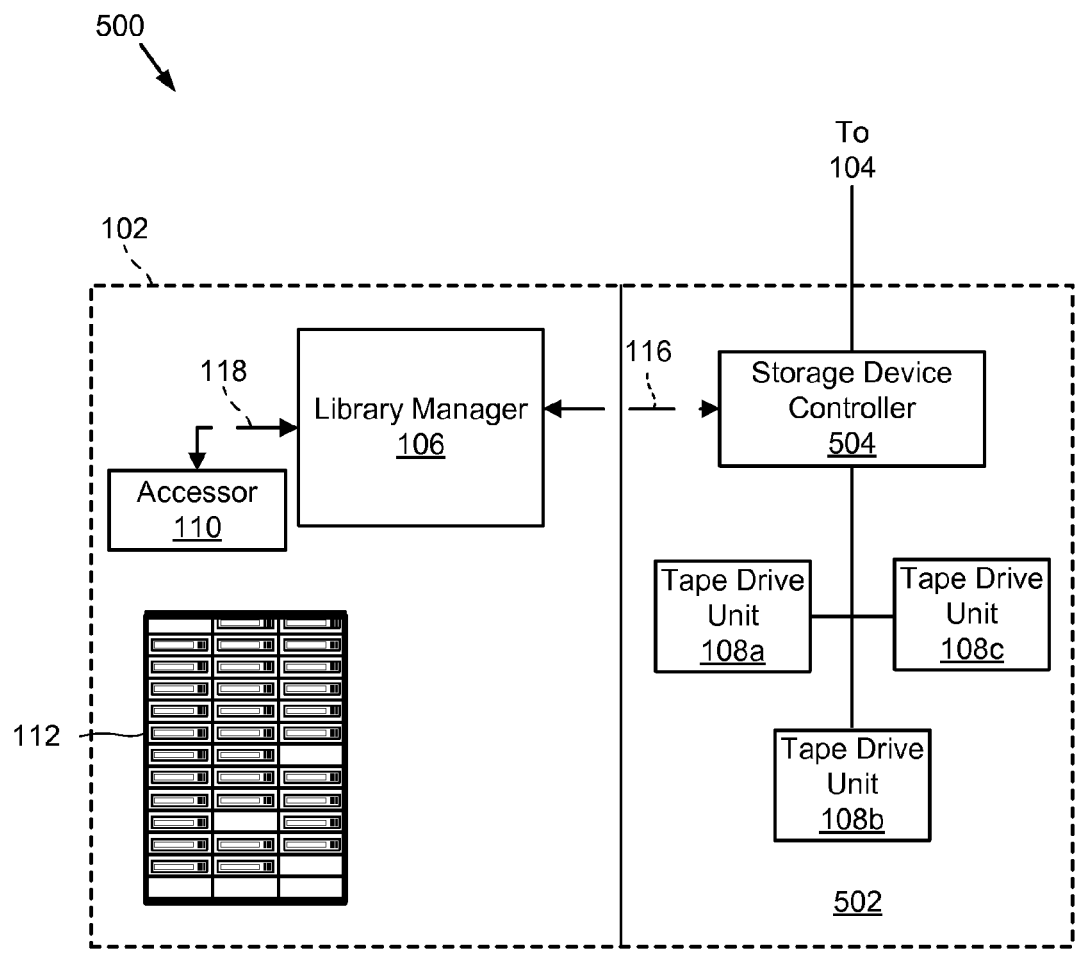
FIG. 5 is a block diagram illustrating another embodiment of a system for communicating control messages between a first device and a second device in accordance with the present invention.

In FIG. 5, an alternative embodiment of a system 500 for communicating control messages between a first device and a second device is illustrated. Typically, an automated library unit 102 communicates with drive units 108 according to one or more configurations. Drive units 108 under one configuration may be grouped in a frame 502. The automated library unit 102 may support modern and legacy drive unit configurations.

FIG. 2 illustrates a plurality of drive units 108a, 108b, 108c, that may be organized into a frame 502 that eliminates the need for individual control links 118 between the drive units 108 and the LM 106. Instead, CMs 202 are exchanged over a logical communication path 204 by way of a host 104.

FIG. 5 illustrates an alternative frame 502 configuration in which a plurality of tape drive units 108a, 108b, 108c communicate by way of a storage device controller 504. A control path 116 couples the storage device controller 504 to the LM 106. The storage device controller 504 communicates with the drive units 108 over a data path 114.

Conventionally, the frame 502 configuration of FIG. 5 provided little exchange of messages between the LM 106 and the drive units 108. In contrast, the LM 106, storage device controller 504, and drive units 108 are configured to respectively implement the communication module 308, translation module 310, and transmission module 312 described above in relation to FIG. 3. Consequently, a logical communication path 204 exists such that the LM 106 and drive units 108 may exchange CMs 202. In this manner, the LM 106 may more directly control the mechanical behavior of the drive units 108 to coordinate interaction with the accessor 110.

In one embodiment, the storage device controller 504 is configured to direct data messages between an external host 104 and the plurality of drive units 108. In addition, the storage device controller 504 relays CMs 202 between the LM 106 and drive units 108. In certain embodiments, the storage device controller 504 comprises substantially a host integrated into the frame 502 of the automated library unit 102. Of course the automated library unit 102 may include additional frames 502 in which drive units 108 are configured according to FIG. 2.

In summary, the present invention provides a system, method, and apparatus that replaces control links 118 between the LM 106 and the drive units 108 with a logical communication path 204. Replacing physical control links 118 between the LM 106 and the drive units 108 allows the LM 106 to control and coordinate almost any number of drive units 108 that are of variable physical distances from the LM 106 at a lower hardware cost. Furthermore, the LM 106 may communicate with a plurality of drive units 108 coupled to a storage device controller 504. In addition, the format and/or semantics of the CMs 202 may be modified without further modification to modules that implement the present invention. The present invention is insulated from the specific implementation of CMs 202.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system having a communication module, a first translation module, a second translation module, a first transmission module, and a second transmission module stored in memories for communicating control messages between a media library manager and a storage device, the system comprising:

the communication module configured to direct first control messages between the media library manager and the storage device through a host, the host coupled to the media library manager by a control path and to the storage device by a data path;

the first translation module configured to distinguish the first control messages received over the control path at the host by detecting an identifier in the header of each of the control messages, translate the first control messages received over the control path into first transport data messages, wherein each of the first transport data messages comprises a Send Simulated Library Message (SSLIM) Small Computer Systems Interface (SCSI) Command Descriptor Block (CDB) that encapsulates each of the first control messages in an unaltered form;

the second translation module configured to translate second control messages received from the storage device into second transport data messages, wherein each of the second transport data messages comprises a Received Simulated Library Message (RSLIM) Small Computer Systems Interface (SCSI) Command Descriptor Block (CDB) that encapsulates each of the second control messages in an unaltered form;

the second translation module further configured to translate the first transport data messages received over the data path at the storage device into the first control messages;

the first translation module further configured to translate the second transport data messages received over the data path at the host into the second control messages;

the first transmission module configured to send the first transport data messages over the data path to the storage device and control messages from the storage device over the control path to the media library manager; and the second transmission module configured to send the second transport data messages over the data path to the host.

2. The system of claim 1, further comprising the media library manager polling the storage device for a response control message subsequent to sending the first control message to the storage device.

3. The system of claim 1, further comprising the host periodically polling a plurality of storage device coupled to the data path for the second control messages for the media library manager.

4. The system of claim 1, further comprising a storage device notifying the host of the second control message for the media library manager and the host transferring the second control message from the storage device to the media library manager in response to a message from the media library manager.

5. The system of claim 1, wherein the media library manager and storage device are configured to exchange control messages with the host.

6. A system for communicating control messages between a media library manager and a plurality of storage devices, comprising:

a media library manager configured to direct first control messages for a plurality of storage devices over a host control path;

a host coupled to the host control path and configured to distinguish the first control messages received over the host control path at the host by detecting an identifier in a header of each of the first control messages, transmit the first control messages as first transport data messages on a data path connecting the host to the plurality of storage devices, wherein each of the first transport data messages comprises a Send Simulated Library Message (SSLIM) Small Computer Systems Interface (SCSI) Command Descriptor Block (CDB) that encapsulates each of the first control messages in an unaltered form, and translate second transport data messages received over the data path into second control messages and transmits the second control messages on the host control path connecting the host to the media library manager; and wherein the plurality of storage devices are configured to translate the first transport data messages received over the data path into the first control messages and the second control messages for the media library manager into the second transport data messages comprising a Receive Simulated Library Message (RSLIM) Small Computer Systems Interface (SCSI) Command Descriptor Block (CDB) that encapsulates each of the second control messages in an unaltered form for transmission over the data path to the host.

7. The system of claim 6, wherein the media library manager is configured to poll a storage device for a response control message subsequent to sending the first control message to the storage device.

8. The system of claim 6, wherein the host periodically polls the storage devices coupled to the data path for the second control messages for the media library manager.

9. The system of claim 6, wherein a storage device notifies the host of the second control message for the media library manager and the host transfers the second control message from the storage device to the media library manager in response to a message from the media library manager.

10. A system for communicating control messages between a media library manager and a plurality of storage devices over a data path, comprising:

a media library comprising the media library manager configured to automatically mount and unload media cartridges; and a host configured to communicate over a host control path with the media library manager to access data on a specific media cartridge and to communicate with one or more storage devices over a data path to exchange data, the host further configured to relay first and second control messages between the media library manager and the plurality of storage devices by distinguishing the first control messages by detecting an identifier in a header of the first control messages, translating between the first control messages and first transport data messages, wherein each of the first transport data messages is a storage device bound transport data message and comprises a Send Simulated Library Message (SSLIM) Small Computer Systems Interface (SCSI) Command Descriptor Block (CDB) that encapsulates each of the first control messages in an unaltered form, translating between second transport data messages and second control messages, wherein each of the second transport data messages is a library media manager bound transport data message and comprises a Receive Simulated Library Message (RSLIM) Small Computer Systems Interface (SCSI) Command Descriptor Block (CDB) that encapsulates each of the second control messages in an unaltered form, and wherein the first and second transport data messages travel over the data path and the first and second control messages travel over the host control path.

11. The system of claim 10, wherein the media library manager polls the storage devices for a response control message subsequent to sending the first control message to the storage device.

12. The system of claim 10, wherein the host periodically polls the storage devices coupled to the data path for the second control messages for the media library manager.

13. The system of claim 10, wherein a storage device notifies the host of the second control message for the media library manager and the host transfers the second control message from the storage device to the media library manager in response to a message from the media library manager.

14. The system of claim 10, wherein the media library manager is configured to exchange the first control messages for storage devices over the host control path instead of a direct communication link to the storage devices.

15. The system of claim 10, wherein the host is configured to function as a storage device controller integrated within the media library and coupled to a plurality of storage devices that have no direct communication link to the media library manager.

16. An apparatus for communicating control messages between a media library manager and a storage device, comprising:
memories having stored thereon;
means for directing the control messages between the media library manager and the storage device through a host, the host coupled to the media library manager by a control path and the storage device by a data path;
means for translating, at the host, first control messages received over the control path into first transport data messages, wherein each of the first transport data messages comprises a Send Simulated Library Message (SSLIM) Small Computer Systems Interface (SCSI) Command Descriptor Block (CDB) that encapsulates each of the first control messages in an unaltered form;
means for translating, at the host, second transport data messages received over the data path into second control messages, wherein each of the second transport data messages comprises a Receive Simulated Library Message (RSLIM) Small Computer Systems Interface (SCSI) Command Descriptor Block (CDB) that encapsulates each of the second control messages in an unaltered form;
means for sending the first transport data messages over the data path to the storage device;
means for sending the second control messages from the storage device over the control path to the media library manager; and means for translating, at the storage device, the first transport data messages received by the storage device into the first control messages.

17. The apparatus of claim 16, further comprising means for polling a storage device for a response control message subsequent to sending the first control message to the storage device.

18. The apparatus of claim 16, further comprising means for polling storage devices coupled to the data path for the second control messages for the media library manager.

19. An article of manufacture comprising a program non-transitory storage medium readable by a processor and embodying one or more instructions executable by a processor to perform a method for communicating control messages between a media library manager and a storage device, the method comprising:
directing the control messages between the media library manager and the storage device through a host, the host coupled to the media library manager by a control path and the storage device by a data path;
distinguishing, at the host, first control messages received over the control path by detecting an identifier in a header of each of the first control messages;
translating, at the host, the first control messages into first transport data messages, wherein each transport data message comprises a Send Simulated Library Message (SSLIM) Small Computer Systems Interface (SCSI) Command Descriptor Block (CDB) that encapsulates each of the first control messages in an unaltered form;
sending the first transport data messages over the data path from the host to the storage device;
translating the first transport data messages received by the storage device into the first control messages;
translating, at the storage device, second control messages into second transport data messages, wherein each second transport data message comprises a Receive Simulated Library Message (RSLIM) Small Computer Systems Interface (SCSI) Command Descriptor Block (CDB) that encapsulates each of the second control messages in an unaltered form;
sending the second transport data messages over the data path from the storage device to the host;
translating, at the host, the second transport data messages received over the data path into the second control messages; and
sending the second control messages over the control path from the host to the media library manager.

20. The article of manufacture of claim 19, wherein the method further comprises polling a storage device for a response control message subsequent to sending the first control message to the storage device.

21. The article of manufacture of claim 19, wherein the method further comprises the host polling storage devices coupled to the data path for the second control messages for the media library manager.

* * * * *